United States Patent
Zigmond et al.

(10) Patent No.: US 7,571,232 B2
(45) Date of Patent: Aug. 4, 2009

(54) METHOD AND APPARATUS FOR MANAGING CHANNEL INFORMATION

(75) Inventors: Daniel J. Zigmond, Menlo Park, CA (US); Vivek Thukral, Palo Alto, CA (US); Samuel Thomas Scott, Los Gatos, CA (US)

(73) Assignee: Microsoft Corporation, Redmond, WA (US)

( * ) Notice: Subject to any disclaimer, the term of this patent is extended or adjusted under 35 U.S.C. 154(b) by 1063 days.

(21) Appl. No.: 10/806,976

(22) Filed: Mar. 22, 2004

(65) Prior Publication Data

US 2005/0210138 A1 Sep. 22, 2005

(51) Int. Cl.
*G06F 15/16* (2006.01)
*H04N 5/445* (2006.01)
*H04N 7/173* (2006.01)

(52) U.S. Cl. .......................... 709/227; 725/38; 725/39; 725/56; 725/91

(58) Field of Classification Search ........................ None
See application file for complete search history.

(56) References Cited

U.S. PATENT DOCUMENTS

| | | | |
|---|---|---|---|
| 5,654,747 A | 8/1997 | Ottesen et al. | |
| 5,682,597 A | 10/1997 | Ganek et al. | |
| 5,724,646 A | 3/1998 | Ganek et al. | |
| 5,751,282 A | 5/1998 | Girard et al. | |
| 5,815,195 A | 9/1998 | Tam | |
| 6,119,163 A * | 9/2000 | Monteiro et al. | 709/227 |
| 6,317,885 B1 | 11/2001 | Fries | |
| 6,392,664 B1 * | 5/2002 | White et al. | 715/717 |
| 6,400,407 B1 | 6/2002 | Zigmond et al. | |
| 6,628,301 B1 | 9/2003 | Acton et al. | |
| 6,628,302 B2 | 9/2003 | White et al. | |
| 6,643,298 B1 | 11/2003 | Brunheroto et al. | |
| 7,089,309 B2 * | 8/2006 | Ramaley et al. | 709/226 |
| 7,143,288 B2 | 11/2006 | Pham et al. | |
| 7,171,485 B2 * | 1/2007 | Roach et al. | 709/232 |
| 7,380,258 B2 | 5/2008 | Durden et al. | |
| 2002/0108126 A1 * | 8/2002 | Horowitz et al. | 725/141 |
| 2002/0199184 A1 | 12/2002 | Cezeaux | |
| 2003/0149981 A1 | 8/2003 | Finster et al. | |
| 2003/0161395 A1 | 8/2003 | Byers | |
| 2003/0192059 A1 | 10/2003 | Soloff et al. | |
| 2004/0060063 A1 * | 3/2004 | Russ et al. | 725/46 |
| 2004/0117839 A1 | 6/2004 | Watson et al. | |
| 2004/0181800 A1 | 9/2004 | Rakib et al. | |
| 2004/0249962 A1 | 12/2004 | Lecomte | |
| 2005/0076394 A1 | 4/2005 | Watson et al. | |
| 2005/0108768 A1 | 5/2005 | Deshpande et al. | |
| 2005/0160465 A1 | 7/2005 | Walker | |

OTHER PUBLICATIONS

Braun, Andreas et al., "The Software Headend Architecture—A New Approach for Multi-Standard CATV Headends," 2002 Digest of Technical Papers, IEEE International Conference on Consumer Electronics, Jun. 18, 2002, pp. 156-157.

* cited by examiner

*Primary Examiner*—John B. Walsh
(74) *Attorney, Agent, or Firm*—Lee & Hayes, PLLC (57) ABSTRACT

A request for content associated with a particular channel is received from a client device. A system identifies service information data associated with the channel. The system then determines how content associated with the channel will be provided to the client device. Instructions are sent to the client device that notify the client device how to access content associated with the channel.

33 Claims, 5 Drawing Sheets

METHOD AND APPARATUS FOR MANAGING CHANNEL INFORMATION

TECHNICAL FIELD

The systems and methods described herein relate to maintaining channel information and distributing the channel information to client devices.

BACKGROUND

A client device in a television-based system can receive video and audio content from a program distributor in the form of broadcast programs, such as news programs, sitcoms, movies, sporting events, commercials, and any other type of television-based information. A client device includes, for example, a set-top box, a digital satellite receiver, a cable box, a digital video recorder (DVR), and a television with a built-in receiver.

To tune channels in existing systems, such as digital cable television systems, a viewer tunes to a particular channel and the client device (e.g., cable box) looks up the requested channel in a channel map to identify a program identifier (PID) associated with the requested channel. The program identifier is used by the client device to receive the requested channel. PID information can change on an irregular basis. For example, channels may be added or deleted, or the bandwidth assigned to a particular channel may change, which may require a rearrangement of channels to accommodate the changed bandwidth. Other changes include changes include addition or deletion of a foreign language audio version of the soundtrack associated with the video content.

If a client device does not contain the current PID information, the client device may not tune the correct channel. To avoid this situation, existing systems receive channel information (including a current channel map) from, for example, a headend on a regular basis. This channel information is typically broadcast by the headend to all client devices capable of receiving data from the headend. The channel information is then stored in the client device. Thus, the client device needs to have a memory device, such as a persistent memory device, capable of storing all channel information. Including such a memory device in a client device increases the cost and complexity of the client device.

If a client device is not powered on or not connected to a communication line (e.g., cable) when a updated channel information is broadcast by the headend, the client device will not receive the updated channel information. Instead, the client device will continue using old channel information, which may cause the client device to improperly tune one or more channels.

SUMMARY

The systems and methods described herein relate to handling channel information and distributing channel information to one or more client devices. In a particular embodiment, a request is received for content associated with a particular channel. This request is received from a client device. Service information data associated with the channel is identified and a determination is made regarding how content associated with the channel will be provided to the client device. Instructions are then sent to the client device. These instructions notify the client device how to access content associated with the channel.

BRIEF DESCRIPTION OF THE DRAWINGS

Similar reference numbers are used throughout the figures to reference like components and/or features.

DETAILED DESCRIPTION

The systems and methods described herein relate to maintaining channel information and distributing the channel information to client devices on an as-needed basis. These systems and methods store channel information, such as a channel map, service definition information, and network information in a central location and distribute the channel information to specific client devices when needed by the client device. In one embodiment, this central location is remote from the client devices. For example, the channel information may be stored in a storage device, such as a server or a database coupled to a server, associated with a headend system that provides content to the client devices. This arrangement ensures that each client device has the necessary channel information at the appropriate time, but does not require each client device to have a memory device that continually stores all of the channel information. Additionally, these systems and methods do not require the continual broadcast (and re-broadcast) of channel information to all client devices to be sure each client device has current channel information.

When utilizing the systems and methods discussed herein, the client device may have limited resources, such as no persistent memory, because the channel information and other configuration information that needs to be persisted is stored remotely from the client device. By reducing resources in the client device, the cost and complexity of the client device is also reduced.

The systems and methods discussed herein are described with reference to an environment in which content is distributed to client devices via a data communication network, such as the Internet. These examples represent one possible environment in which the systems and methods can be implemented. In other embodiments, any type of system or architecture can be used to provide content to one or more client devices.

Client devices of the type discussed herein range from clients with substantial memory and processing resources, such as television-enabled personal computers and television recorders equipped with hard-disks, to clients with little or no memory and/or limited processing resources. Although particular examples of client devices are discussed herein, any client device can be used with the systems and methods described. Example client devices include personal computers, DVD players, digital video recorders (DVRs), set top boxes, cable boxes, satellite receivers, televisions, game consoles, and the like. As used herein, the term "user" may also be referred to as "viewer". Also, as used herein, the terms "state information", "configuration information", and "configuration settings" are used interchangeably.

Various examples discussed herein refer to a "headend" or "head end". As used herein, these terms refer to any location from which data may be sent. Example headends include traditional broadcast facilities, data centers, network operations centers, locations where one or more servers are situated, and the like.

The systems and methods discussed herein refer to various types of channel information. Although particular examples of channel information are discussed herein, other examples may include additional types of data not described herein. Channel information may include any type of data associated with a channel or other source of content. Channel information may include data associated with tuning or receiving any type of content, such as television content, video-on-demand (VOD) content, pay-per-view (PPV) content, advertising content, computer-based content, radio content, and the like. As used herein, a "channel" may be any communication link, transmission path, or other architecture for communicating data.

Figure 1:
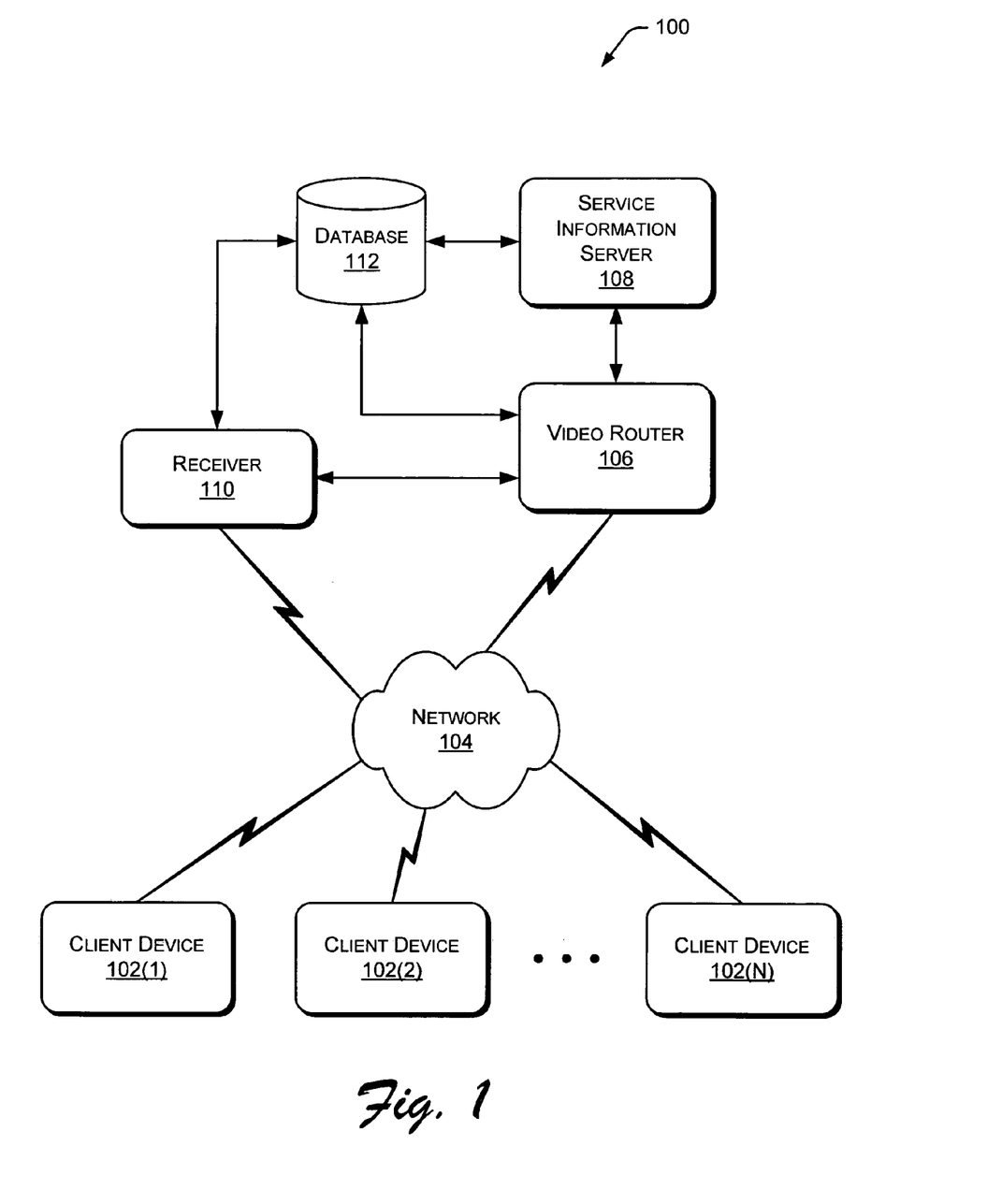
FIG. 1 illustrates various components of an example architecture capable of maintaining channel information and providing the channel information to one or more client devices.

FIG. 1 illustrates various components of an example architecture 100 capable of maintaining channel information and providing the channel information to one or more client devices 102. In this example architecture 100, content (such as television programs, video-on-demand, advertisements, radio programs, and the like) is distributed via a data communication network 104, such as the Internet. Architecture 100 provides two-way communication of data between client devices and one or more servers or other devices via network 104. In alternate embodiments, content is distributed to client devices 102 via a cable network, radio frequency signals, over-the-air broadcast, satellite communication systems, and the like.

In a particular embodiment, client devices 102 communicate with one or more devices via network 104 using simple object access protocol (SOAP) messages transported using hypertext transfer protocol (http), a protocol commonly used by the World Wide Web. In other embodiments, any type of protocol and/or messaging format can be used to exchange data between client devices 102 and one or more servers.

In one embodiment, each client device 102 has a unique identifier stored within the client device. For example, the unique identifier may be stored in a non-volatile memory device or other component of the client device. Since each client device 102 has a unique identifier, each client device can be distinguished from the other client devices. Although not shown in FIG. 1, each client device 102 may be coupled to a display device (such as a television, computer monitor, or projector), a recording device (such as a VCR or DVR), or other device. Alternatively, one or more client devices 102 may themselves be televisions, recording devices, or other devices.

In the example of FIG. 1, network 104 may be any type of data communication network and may include two or more different networks, such as a local area network (LAN) and the Internet. A video router 106 is also coupled to network 104. Video router 106 is capable of communicating content, configuration information, and other data to one or more client devices 102. Additionally, video router 106 is capable of receiving, handling, and storing various types of content and other data. As discussed below, video router 106 also receives requests for configuration information and requests for content from client devices 102 and performs the necessary functions to provide the requested information or content to the requesting client device. In one embodiment, video router 106 is a server capable of performing a variety of functions. For example, video router 106 can encrypt data, decrypt data, and distribute different content to different client devices. Video router 106 can handle any type of data, including video data, audio data, configuration data, and the like. Video router 106 may also be referred to as a "video server" or a "content server".

A service information server 108 is coupled to video router 106. Service information server 108 maintains various service information data that is used by client devices to tune a particular channel. For example, the service information data allows a client device to locate a signal for a particular channel so that the content available on that channel can be displayed to a viewer. The service information data is discussed in greater detail below.

A receiver 110 is coupled to video router 106 and network 104. Receiver 110 receives broadcast content, program guide content, service information data, and other data from a variety of sources. For example, receiver 110 can receive broadcast content from a content broadcaster via network 104, a cable network, radio frequency signals, over-the-air broadcast, satellite communication systems, or any other communication medium. Receiver 110 may receive content from multiple broadcast sources simultaneously.

A database 112 is coupled to video router 106, service information server 108 and receiver 110. Database 112 stores various information used by video router 106, such as service information data, configuration information related to client devices 102, and the like. Database 112 may also store information used by receiver 110 and may store content received from one or more different data sources.

Traditional television broadcasting systems (such as cable TV broadcasters or satellite broadcasters) originate and communicate signals to customers from a headend. In the architecture of FIG. 1, the headend may be considered as the equipment used to deliver content and provide other services to multiple customers (e.g., via client devices 102). The headend interacts with each client device 102 to provide content that is appropriate for the client device based on the settings, preferences, and account information associated with the client device. Referring to FIG. 1, any one or more of the following devices may be considered as the "headend": video router 106, service information server 108, receiver 110, and database 112. In other embodiments, one or more additional devices may be considered part of the headend.

In the example of FIG. 1, service information data is distributed to client devices 102 via video router 106 as needed by the client devices. Thus, rather than distributing service information data to all client devices 102, the client devices receive service information data when such data is necessary to tune a particular channel. This arrangement ensures that client devices 102 receive current versions of the service information data.

Although video router 106 is shown in FIG. 1 as a single device, alternate embodiments may use two or more devices to implement the functionality of video router 106. In other embodiments, the video router 106 may be combined with one or more other components into a single device. For example, receiver 110 and database 112 may be combined with video router 106 in a single device.

Figure 2:
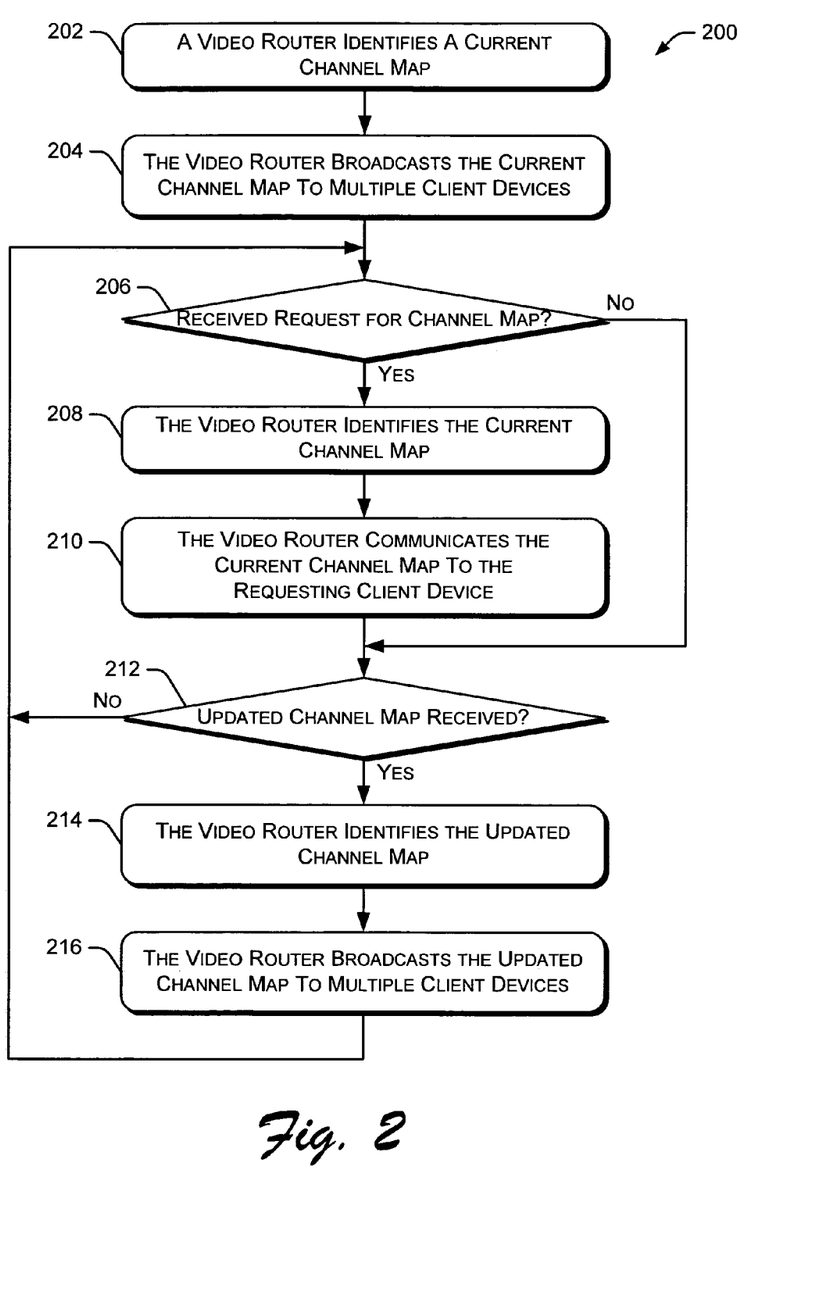
FIG. 2 is a flow diagram illustrating an embodiment of a procedure for handling channel map information.

FIG. 2 is a flow diagram illustrating an embodiment of a procedure 200 for handling channel map information. Initially, a video router identifies a current channel map (block 202). For example, the video router may access the current channel map from a database, a service information server, or other device. The channel map defines what channels and/or services are associated with particular channel numbers. The channel map associates a particular identifier with each channel number. For example, a particular channel map entry may associate HBO with channel 501 and Animal Planet with channel 247. Client devices request content associated with a particular channel by communicating a request to the video router with the identifier associated with the desired channel.

The video router then broadcasts the current channel map to multiple client devices (block 204). These multiple client devices include some or all of the currently active client devices coupled to the video router. At this point, each of the multiple client devices includes current channel map information that allows each client device to generate a request to tune to a particular channel. Procedure 200 continues by determining whether a request has been received from a client device for a channel map (block 206). For example, a client device may have been powered on or reset after the channel map was broadcast in block 204.

If a request for a channel map has been received, the video router identifies the current channel map (block 208) and communicates the current channel map to the requesting client device (block 210). The procedure continues by determining whether an updated channel map has been received by the video router (block 212). If so, the video router identifies the updated channel map (block 214) and broadcasts the updated channel map to multiple client devices (block 216). The procedure then returns to block 206 to check for new requests for a channel map.

Thus, when a client device is powered on or reset, the client device quickly receives a current channel map from the video router. As soon as the video router receives an updated channel map, the video router broadcasts the updated channel map to all client devices such that all client devices maintain a current channel map. However, the remaining data necessary to receive content associated with a particular channel is not sent until a specific channel request is received from a client device.

As discussed above, service information server 108 (FIG. 1) maintains various service information data used by client devices to tune a particular channel. This service information data includes channel map data, service definition data, and network information data. As discussed above, channel map data identifies what services are associated with various channel numbers. The channel map associates a particular identifier with each channel number. In particular embodiments, separate channel maps are maintained for each client device. For example, one client device may map MSNBC data to channel number 2, whereas another client device may map the same MSNBC data to channel number 10. A user of a client device can revise channel mappings at any time via the client device, via an application program, via a web site capable of accessing service information server 108, and the like.

Service definition data identifies various components of the content that are available. These components include, for example, video versions available (regular resolution or high definition television (HDTV)), audio versions available (English, German, or Chinese), and whether subtitles are available. Network information data identifies frequencies, addresses, etc. that are used to tune to a particular channel. For example, network information data may include an Internet protocol (IP) address or a multicast address at which the requested content can be received.

Figure 3:
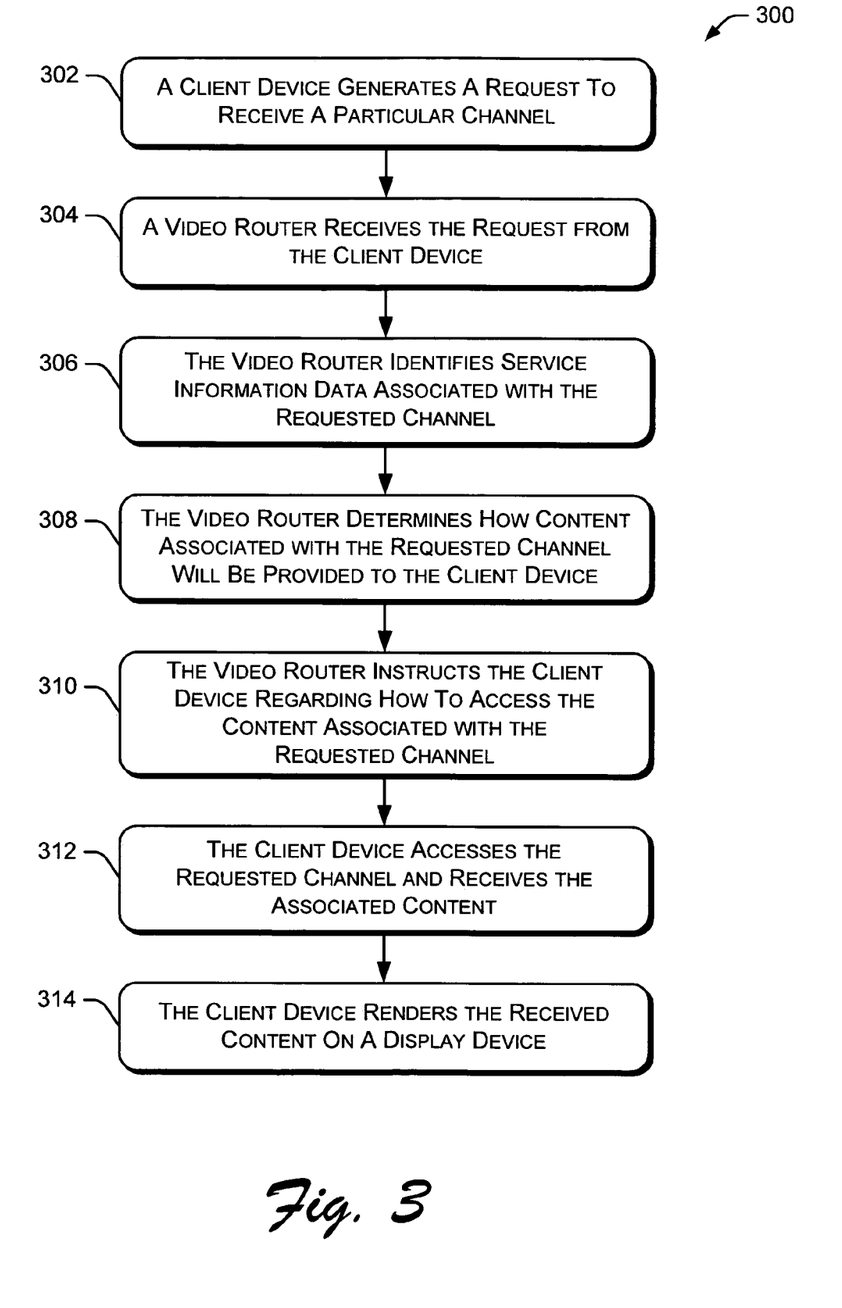
FIG. 3 is a flow diagram illustrating an embodiment of a procedure for providing requested content to a client device.

FIG. 3 is a flow diagram illustrating an embodiment of a procedure 300 for providing requested content to a client device. Initially, a client device generates a request to receive a particular channel (block 302). This request may be generated, for example, in response to a viewer's request to view the particular channel. A video router receives the request from the client device (block 304). The video router identifies service information data associated with the requested channel (block 306). For example, the video router may obtain the appropriate service information data from the service information server. The video router then determines how content associated with the requested channel will be provided to the client device (block 308). As discussed above, the video router may make this determination based on one or more factors, such as the time of day, current network activity, client device type and capabilities, client preferences (e.g., language preference, video quality preference, etc.), load balancing concerns, and the like. When making this determination, the video router may consider configuration information and a device type identifier associated with the client device to identify capabilities and/or preferences associated with the client device. Additionally, the video router may consider the client device's capability profile or a viewer's rate tier when determining how content will be provided to the client device. For example, the client device may have a profile that states that it has enough bandwidth for standard definition stereo (two channel) delivery. This factor is used to select the appropriate data stream that conforms to the bandwidth processing constraint. A different client profile may specify high definition, multi-channel, multi-lingual audio delivery.

Another factor used to determine how content will be provided to the client device is the aggregate household bandwidth. With IP-based delivery of content, the total bandwidth available to the client device(s) within a household is considered. For example, if one client device is receiving channel 2, a second client device may only have enough bandwidth to receive a lower resolution stream of channel 4.

After the video router determines how content associated with the requested channel will be provided to the client device, the video router instructs the client device regarding how to access the content associated with the requested channel (block 310). The instructions provided to the client device are limited to the service information data required for the client device to receive the requested signal. By limiting the instructions in this manner, a minimal amount of data is communicated from the video router to the client device, thereby reducing network traffic and reducing the computing requirements of the video router.

The client device then receives the instructions from the video router, accesses the requested channel using the instructions from the video router, and receives the associated content (block 312). The client device then renders the received content on a display device coupled to the client device (block 314).

Referring again to FIG. 1, the example architecture 100 is capable of hosting multiple different codecs (compressor/decompressor or coder/decoder). A codec is a technique for compressing and decompressing data. Example codecs include MPEG (Moving Picture Experts Group) and Windows Media® technologies player format. A codec may also be referred to as an "encryption format" or a "decryption format". Since video router 106 does not send the service information data associated with a specific channel until a client device 102 requests that specific channel, the content can be delivered to the client device using any codec. Further, different transport types can be used to deliver content to client devices 102. Example transport types include unicast and multicast. Unicast is a communication of data between two devices across a network. Multicast is a communication of data from a single source device to a particular group of destination devices. Architecture 100 allows content to be delivered to different client devices 102 using different codecs and/or different transport types. For example, a first client device 102(1) may receive content associated with a particular channel via multicast using MPEG-2 encoding. Another client device 102(2) receives content associated with the same channel via unicast using Windows Media® technologies player format encoding.

Video router 106 determines which codec and transport type to use in response to a particular request based on several factors. These factors include any current encoding of the requested content, codecs and transport types supported by the requesting client device, local storage associated with the requesting client device, bandwidth available between the video router and the requesting client device, and load balancing issues between multiple transports, codecs, etc.

As mentioned above, the video router instructs client devices how to access content associated with a requested channel. These instructions include, for example, how to decode (or decrypt) the content and an address on which the content will be delivered. For example, the instructions may notify a particular client device that the requested content is being delivered via multicast on multicast address Y using MPEG-2 encoding. In this example, Y is a particular address associated with the requested content. In the case of a multicast delivery of content, multiple client devices may receive the same content using the same multicast address. In another example, the instructions may notify a particular client device that the requested content is being delivered via unicast on unicast address Z using Windows Media® technologies player format encoding. In this example, Z is a particular address associated with the requested content. The codec and transport type used may vary depending on, for example, load balancing factors, client device capabilities, and whether the requested content is already being delivered to other client devices (such as via a multicast address).

Figure 4:
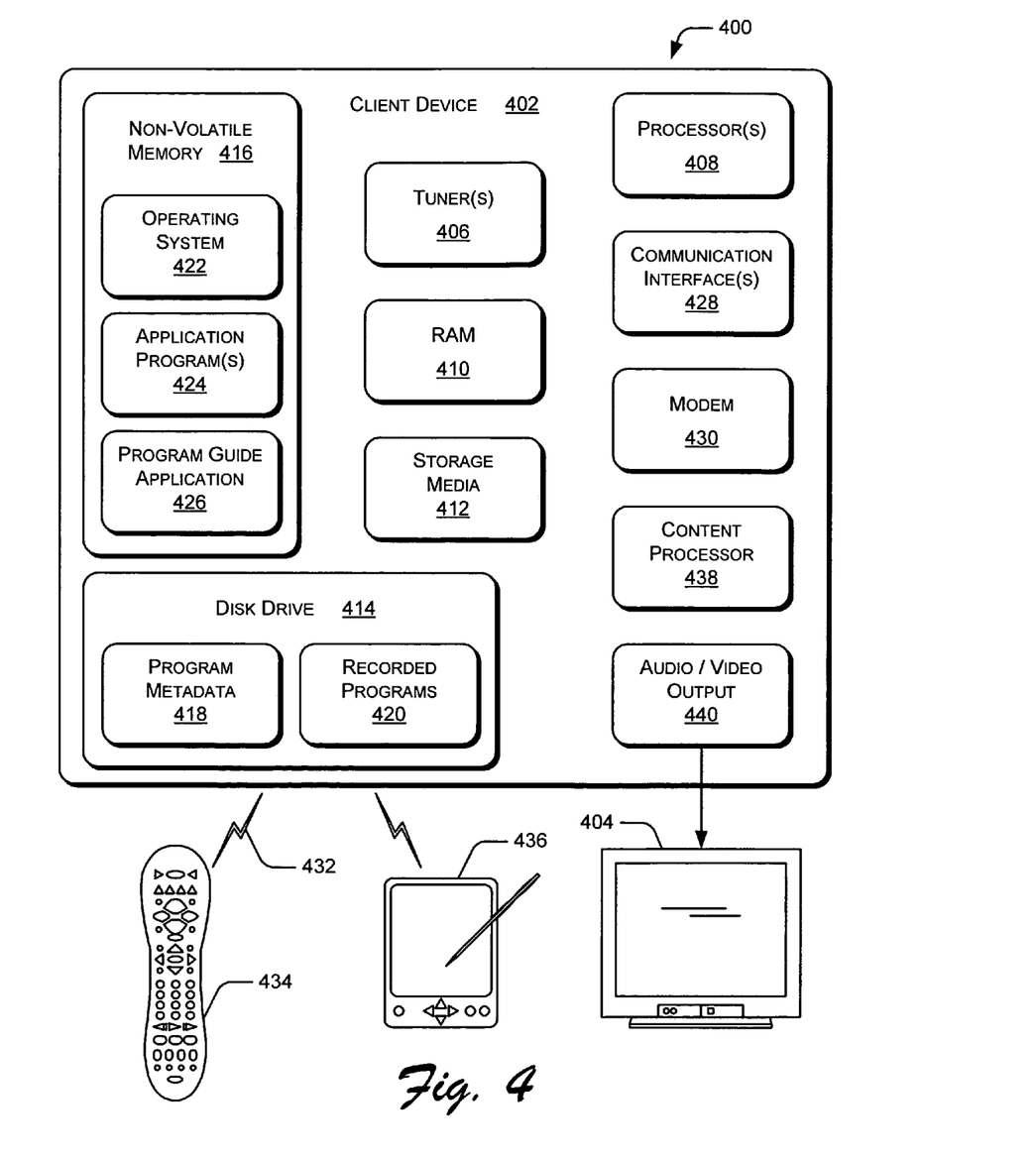
FIG. 4 illustrates a television-based system that includes an example client device.

FIG. 4 illustrates a television-based system 400 that includes an example client device. System 400 also includes a display device 404 to display, for example, video content, program listings, and other data. Client device 402 can be implemented as a set-top box, a satellite receiver, a TV recorder with a hard disk, a digital video recorder (DVR) and playback system, a game console, an information appliance, and as any number of similar embodiments.

Client device 402 includes one or more tuners 406 which are representative of one or more in-band tuners that tune to various frequencies or channels to receive television signals, as well as an out-of-band tuner that tunes to the broadcast channel over which program data is broadcast to client device 402. Client device 402 also includes one or more processors 408 (e.g., any of microprocessors, controllers, and the like) which process various instructions to control the operation of client device 402 and to communicate with other electronic and computing devices.

Client device 402 can be implemented with one or more memory components, examples of which include a random access memory (RAM) 410, mass storage media 412, a disk drive 414, and a non-volatile memory 416 (e.g., ROM, Flash, EPROM, EEPROM, etc.). Disk drive 414 can include any type of magnetic or optical storage device, such as a hard disk drive, a magnetic tape, a rewriteable compact disc, a DVD, and the like. The one or more memory components store various information and/or data such as received content, program metadata 418, recorded programs 420, configuration information for client device 402, and/or graphical user interface information. Alternative implementations of client device 402 can include a range of processing and memory capabilities, and may include any number of differing memory components than those illustrated in FIG. 4. For example, full-resource clients can be implemented with substantial memory and processing resources, whereas low-resource clients may have limited processing and memory capabilities.

An operating system 422 and one or more application programs 424 can be stored in non-volatile memory 416 and executed on processor(s) 408 to provide a runtime environment. A runtime environment facilitates extensibility of client device 402 by allowing various interfaces to be defined that, in turn, allow application programs 424 to interact with client device 402. The application programs 424 can include a browser to browse the Web (e.g., "World Wide Web"), an email program to facilitate electronic mail, a program to display and search for available programs and video-on-demand content, and any number of other application programs.

A program guide application 426 that executes on processor(s) 408 is also stored in non-volatile memory 416 and is implemented to generate a program guide for display. Using program guide application 426, the viewer can look at schedules of current and future programming, set reminders for upcoming programs, and/or enter instructions to record one or more programs.

Client device 402 further includes one or more communication interfaces 428 and a PSTN, DSL, cable, or other type of modem 430. A communication interface 428 can be implemented as a serial and/or parallel interface, as a wireless interface, and/or as any other type of network interface. A wireless interface enables client device 402 to receive control input commands 432 and other information from a user-operated input device, such as from a remote control device 434 or from another infrared (IR), 802.11, Bluetooth, or similar RF input device. Input devices can include a wireless keyboard or another handheld input device 436 such as a personal digital assistant (PDA), handheld computer, wireless phone, or the like. A network interface and a serial and/or parallel interface enables client device 402 to interact and communicate with other electronic and computing devices via various communication links. Modem 430 facilitates client device 402 communication with other electronic and computing devices via a conventional telephone line, a DSL connection, cable, and/or other type of connection.

Client device 402 also includes a content processor 438 which can include a video decoder and/or additional processors to receive, process, and decode broadcast video signals and program data, such as NTSC, PAL, SECAM, or other television system analog video signals, as well as DVB, ATSC, or other television system digital video signals. For example, content processor 438 can include an MPEG-2 or MPEG-4 decoder that decodes MPEG-encoded video content and/or image data. The systems described herein can be implemented for any type of video encoding format as well as for data and/or content streams that are not encoded.

Typically, video content and program data includes video data and corresponding audio data. Content processor 438 generates video and/or display content that is formatted for display on display device 404, and generates decoded audio data that is formatted for presentation by a presentation device, such as one or more speakers (not shown) in display device 404. Content processor 438 can include a display controller (not shown) that processes the video and/or display content to display corresponding images on display device 404. A display controller can include a graphics processor, microcontroller, integrated circuit, and/or similar video processing component to process the images.

Client device 402 also includes an audio and/or video output 440 that provides the audio, video, and/or display signals to television 404 or to other devices that process and/or display, or otherwise render, the audio and video data. Video signals and audio signals can be communicated from client device 402 to television 404 via an RF (radio frequency) link, S-video link, composite video link, component video link, or other similar communication link.

Although shown separately, some of the components of client device 402 may be implemented in an application specific integrated circuit (ASIC). Additionally, a system bus (not shown) typically connects the various components within client device 402. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Figure 5:
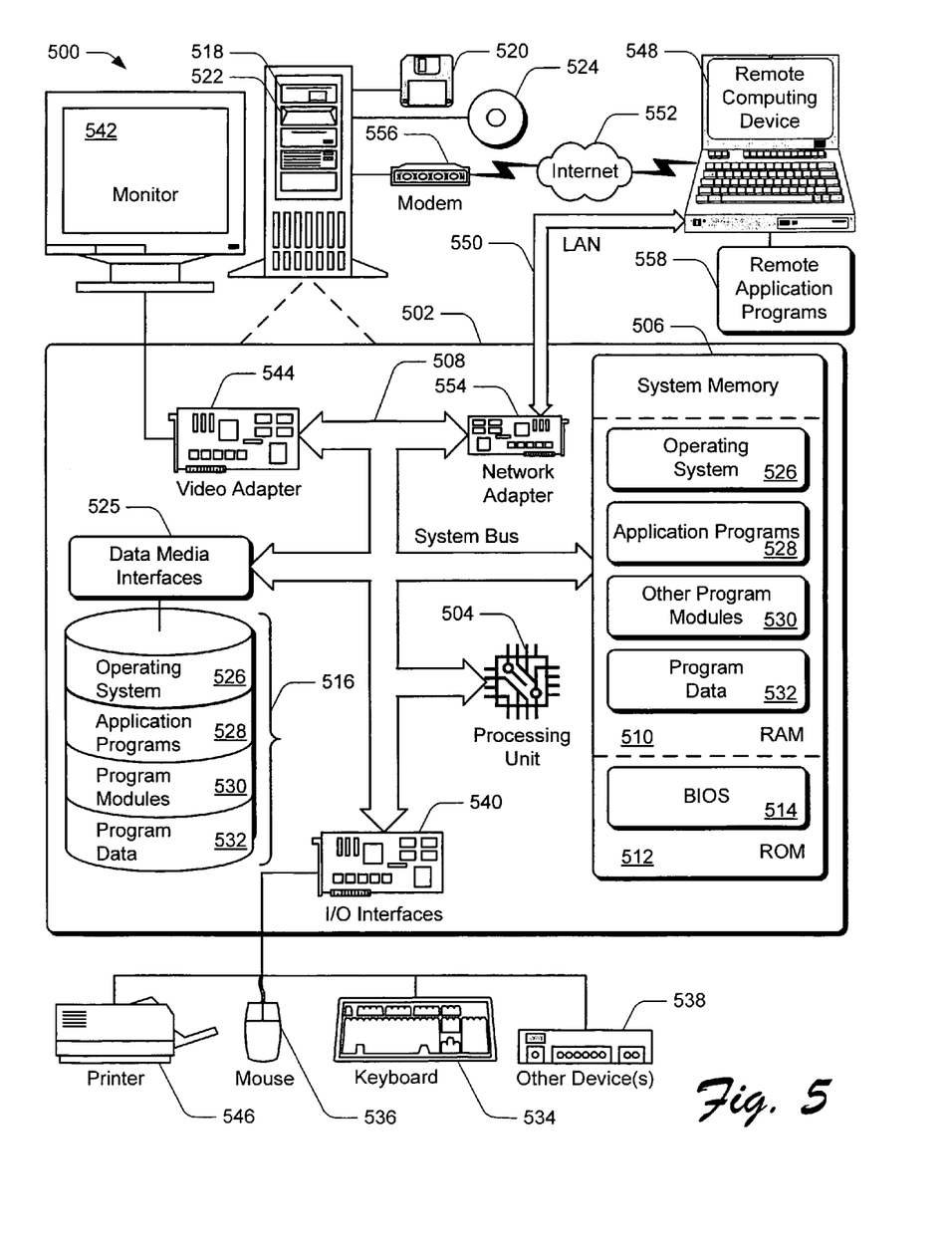
FIG. 5 illustrates a general computer environment, which can be used to implement the techniques described herein.

FIG. 5 illustrates a general computer environment 500, which can be used to implement the techniques described herein. For example computer environment 500 may implement a video router, a service information server, a content server, or other computing device. The computer environment 500 is only one example of a computing environment and is not intended to suggest any limitation as to the scope of use or functionality of the computer and network architectures. Neither should the computer environment 500 be interpreted as having any dependency or requirement relating to any one or combination of components illustrated in the example computer environment 500.

Computer environment 500 includes a general-purpose computing device in the form of a computer 502. One or more applications can be executed by computer 502. The components of computer 502 can include, but are not limited to, one or more processors or processing units 504 (optionally including a cryptographic processor or co-processor), a system memory 506, and a system bus 508 that couples various system components including the processor 504 to the system memory 506.

The system bus 508 represents one or more of any of several types of bus structures, including a memory bus or memory controller, a point-to-point connection, a switching fabric, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 502 typically includes a variety of computer readable media. Such media can be any available media that is accessible by computer 502 and includes both volatile and non-volatile media, removable and non-removable media.

The system memory 506 includes computer readable media in the form of volatile memory, such as random access memory (RAM) 510, and/or non-volatile memory, such as read only memory (ROM) 512. A basic input/output system (BIOS) 514, containing the basic routines that help to transfer information between elements within computer 502, such as during start-up, is stored in ROM 512. RAM 510 typically contains data and/or program modules that are immediately accessible to and/or presently operated on by the processing unit 504.

Computer 502 may also include other removable/non-removable, volatile/non-volatile computer storage media. By way of example, FIG. 5 illustrates a hard disk drive 516 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 516, magnetic disk drive 518, and optical disk drive 522 are each connected to the system bus 508 by one or more data media interfaces 525. Alternatively, the hard disk drive 516, magnetic disk drive 518, and optical disk drive 522 can be connected to the system bus 508 by one or more interfaces (not shown).

The disk drives and their associated computer-readable media provide non-volatile storage of computer readable instructions, data structures, program modules, and other data for computer 502. Although the example illustrates a hard disk 516, a removable magnetic disk 520, and a removable optical disk 524, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on the hard disk 516, magnetic disk 520, optical disk 524, ROM 512, and/or RAM 510, including by way of example, an operating system 526, one or more application programs 528, other program modules 530, and program data 532. Each of such operating system 526, one or more application programs 528, other program modules 530, and program data 532 (or some combination thereof) may implement all or part of the resident components that support the distributed file system.

A user can enter commands and information into computer 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB).

A monitor 542 or other type of display device can also be connected to the system bus 508 via an interface, such as a video adapter 544. In addition to the monitor 542, other output peripheral devices can include components such as speakers (not shown) and a printer 546 which can be connected to computer 502 via the input/output interfaces 540.

Computer 502 can operate in a networked environment using logical connections to one or more remote computers, such as a remote computing device 548. By way of example, the remote computing device 548 can be a personal computer, portable computer, a server, a router, a network computer, a peer device or other common network node, game console, and the like. The remote computing device 548 is illustrated as a portable computer that can include many or all of the elements and features described herein relative to computer 502.

Logical connections between computer 502 and the remote computer 548 are depicted as a local area network (LAN) 550 and a general wide area network (WAN) 552. Such networking environments are commonplace in offices, enterprise-wide computer networks, intranets, and the Internet.

When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which can be internal or external to computer 502, can be connected to the system bus 508 via the input/output interfaces 540 or other appropriate mechanisms. It is to be appreciated that the illustrated network connections are exemplary and that other means of establishing communication link(s) between the computers 502 and 548 can be employed.

In a networked environment, such as that illustrated with computing environment 500, program modules depicted relative to the computer 502, or portions thereof, may be stored in a remote memory storage device. By way of example, remote application programs 558 reside on a memory device of remote computer 548. For purposes of illustration, application programs and other executable program components such as the operating system are illustrated herein as discrete blocks, although it is recognized that such programs and components reside at various times in different storage components of the computing device 502, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:
   receiving a request for content associated with a channel at a server including one or more processors, wherein the server is configured to maintain and distribute channel information to client devices, and wherein the request is received from a client device;
   identifying, at the server, an Internet protocol address associated with the content;
   identifying, at the server, service information data associated with the channel based on the Internet protocol address in response to receiving the request for content associated with the channel, wherein the service information data is configured to be used by the client device to tune to the channel, and wherein the service information data is stored in a database coupled to the server;
   determining, at the server, how the content associated with the channel will be provided to the client device in response to identifying the service information data; and
   sending instructions from the server to the client device, wherein the instructions notify the client device how to access the content associated with the channel.

2. A method as recited in claim 1 wherein determining how the content associated with the channel will be provided to the client device includes a transport type associated with the content.

3. A method as recited in claim 1 wherein determining how the content associated with the channel will be provided to the client device includes a codec type associated with the content.

4. A method as recited in claim 1 wherein determining how the content associated with the channel will be provided to the client device includes a transport type and a codec associated with the content.

5. A method as recited in claim 1 further comprising:
   receiving a second request for content associated with a second channel at the server, wherein the second request is received from a second client device;
   identifying, at the server, service information data associated with the second channel;
   determining, at the server, how the content associated with the second channel will be provided to the second client device; and
   sending second instructions from the server to the second client device, wherein the second instructions notify the second client device how to access the content associated with the second channel.

6. A method as recited in claim 1 further comprising:
   receiving a second request for the content associated with the channel at the server, wherein the second request is received from a second client device;
   determining, at the server, how the content associated with the channel will be provided to the second client device, wherein the content associated with the channel will be provided to the client device according to a first format and the content associated with the channel will be provided to the second client device according to a second format that differs from the first format; and sending instructions from the server to the second client device, wherein the instructions notify the second client device how to access the content associated with the channel.

7. A method as recited in claim 1 wherein identifying service information data associated with the channel includes retrieving service information data from a service information server.

8. A method as recited in claim 1 wherein the service information data associated with the channel includes at least one video component associated with the content.

9. A method as recited in claim 1 wherein the service information data associated with the channel includes at least one audio component associated with the content.

10. A method as recited in claim 1 wherein determining how the content associated with the channel will be provided to the client device includes identifying content formats supported by the client device.

11. One or more physical computer-readable storage media containing a computer program that is executable by a processor to perform the method recited in claim 1.

12. A method comprising:
receiving a request for channel map information at a server from a client device, the channel map information defining at least one of channels and services associated with respective channel numbers, and wherein the server includes one or more processors and the server is configured to maintain and distribute channel information to client devices;
identifying current channel map information at the server in response to receiving the request;
communicating the current channel map information from the server to the client device, wherein the current channel map information includes data regarding channels available to the client device, and wherein the client device uses the current channel map information to request content associated with a particular channel available to the client device;
receiving a request for content associated with a channel at the server from the client device after communicating the current channel map information to the client device;
identifying service definition data and network information data associated with the channel at the server in response to receiving the request for content associated with the channel, the service definition data specifying components of the content that are available and the network information data specifying a network address to tune to the channel;
determining, at the server, how to provide the content associated with the channel to the client device based on the network information data and the service definition data; and
sending instructions from the server to the client device, wherein the instructions notify the client device how to access the content associated with the channel.

13. A method as recited in claim 12 further comprising:
receiving updated channel map information at the server; and
communicating the updated channel map information from the server to the client device.

14. A method as recited in claim 12 further comprising:
receiving updated channel map information at the server; and
communicating the updated channel map information from the server to a plurality of client devices.

15. A method as recited in claim 12 further comprising:
receiving a second request for channel map information at the server from a second client device;
identifying second current channel map information at the server; and
communicating the second current channel map information from the server to the second client device, wherein the second current channel map information includes data regarding channels available to the second client device, and wherein the second client device uses the second current channel map information to request content associated with a particular channel available to the second client device.

16. One or more physical computer-readable storage media containing a computer program that is executable by a processor to perform the method recited in claim 12.

17. A method comprising:
generating a request for current channel information at a client devices wherein the client device includes one or more processors and the client device is configured to obtain content of channels based on channel information, the current channel information specifying a channel map that defines at least one of channels and services associated with respective channel numbers;
receiving current channel information at the client device from a video router;
storing the current channel information at the client device;
generating a request for content associated with a particular channel at the client device, wherein the request for content includes data from the current channel information associated with the particular channel;
receiving service information data associated with the particular channel at the client device from the video router;
tuning to the particular channel at the client device utilizing the current channel information and the service information data, wherein the service information data does not persist at the client device after tuning to the particular channel; and
receiving user input at the client device to revise the channel map.

18. A method as recited in claim 17 wherein the received instructions identify a network address associated with the requested content.

19. A method as recited in claim 17 wherein the received instructions identify an encryption format associated with the requested content.

20. A method as recited in claim 17 wherein the received instructions identify a transport mode associated with the requested content.

21. A method as recited in claim 17 further comprising:
generating a request for updated channel information at the client device; and
receiving updated channel information at the client device.

22. A method as recited in claim 21 wherein the client device uses the updated channel information to request content associated with a channel available to the client device.

23. One or more physical computer-readable storage media having stored thereon a computer program that, when executed by one or more processors, causes the one or more processors to perform acts comprising:
receive a request for content from a first client device, wherein the requested content is associated with a specific channel;
determine a first transport type to provide the requested content to the first client device;
send first service information data from a remote database to the first client device in response to receiving the request for content from the first client device, the first service information data configured to be used by the first client device to tune to the specific channel according to the first transport type;

receive a request for the requested content from a second client device;

determine a second transport type to provide the requested content to the second client device; and send second service information data from a remote database to the second client device in response to receiving the request for content from the second client device, the second service information data configured to be used by the second client device to tune to the specific channel according to the second transport type.

24. One or more physical computer-readable storage media as recited in claim 23 wherein the first transport type has an associated multicast address.

25. One or more physical computer-readable storage media as recited in claim 23 wherein the first transport type has an associated Internet protocol address.

26. One or more physical computer-readable storage media as recited in claim 23 wherein the first transport type provides the requested data in a first encryption format and the second transport type provides the requested data in a second encryption format.

27. One or more physical computer-readable storage media as recited in claim 23 wherein the first transport type provides the requested data in an MPEG format.

28. One or more physical computer-readable storage media as recited in claim 23 wherein the first transport type provides the requested data in a Windows Media technologies player format.

29. An apparatus comprising:

a service information server including one or more processors and memory to store service information data associated with a plurality of video channels, wherein the service information server is configured to:

receive a request for content associated with a channel from a client device;

identify a multicast address associated with the content;

identify service information data associated with the channel based on the multicast address in response to receiving the request for content associated with the channel, wherein the service information data is configured to be used by the client device to tune to the channel;

determine how the content associated with the channel will be provided to the client device in response to identifying the service information data; and send instructions to the client device, wherein the instructions notify the client device how to access the content associated with the channel.

30. An apparatus as recited in claim 29 wherein the service information data includes available video quality formats.

31. An apparatus as recited in claim 29 wherein the service information data includes available language formats.

32. An apparatus as recited in claim 29 wherein the service information data includes transport information associated with the requested video channel.

33. An apparatus as recited in 29 wherein a video router is coupled to a data communication network to receive video channel requests and to send data to each requesting client device.

* * * * *